(12) United States Patent
Crane et al.

(10) Patent No.: US 8,040,094 B2
(45) Date of Patent: Oct. 18, 2011

(54) VOLTAGE CLAMPING AND ENERGY RECOVERY CIRCUITS

(75) Inventors: Allan David Crane, Rugby (GB); David Nicholas Lee, Northamptonshire (GB)

(73) Assignee: Converteam Technology Ltd, Warwickshire (GB)

( * ) Notice: Subject to any disclaimer, the term of this patent is extended or adjusted under 35 U.S.C. 154(b) by 506 days.

(21) Appl. No.: 12/315,234

(22) Filed: Dec. 1, 2008

(65) Prior Publication Data

US 2009/0146596 A1 Jun. 11, 2009

(30) Foreign Application Priority Data

Dec. 1, 2007 (GB) .................................. 0723548.4

(51) Int. Cl.
*H02P 27/00* (2006.01)
(52) U.S. Cl. ..................... 318/400.31; 318/800; 318/494
(58) Field of Classification Search ............. 318/400.31, 318/800, 494, 727, 766, 468, 266, 286; 363/21.06, 363/17, 20
See application file for complete search history.

(56) References Cited

U.S. PATENT DOCUMENTS

2006/0268585 A1* 11/2006 Domb et al. ............... 363/21.06

FOREIGN PATENT DOCUMENTS

GB 2 433 360 A 6/2007

* cited by examiner

*Primary Examiner* — Karen Masih
(74) *Attorney, Agent, or Firm* — Kirschstein, et al.

(57) ABSTRACT

A circuit for use with a stator winding of a rotating or linear electrical machine, the stator winding having a number of coils linked by the same number of points of common coupling, includes an electronic commutator circuit having the same number of switching stages, each connected between a respective one of the points of common coupling and first and second main dc lines. Each switching stage includes first and second reverse blocking semiconductor power devices. A voltage clamping circuit includes the same number of clamping stages, each connected between a respective one of the points of common coupling and first and second auxiliary dc lines. Each clamping stage includes first and second diodes and first and second capacitors common to the various clamping stages. A dc to dc converter selectively discharges the first and second capacitors to the first and second main dc lines.

37 Claims, 5 Drawing Sheets

VOLTAGE CLAMPING AND ENERGY RECOVERY CIRCUITS

FIELD OF THE INVENTION

The present invention relates to voltage clamping and energy recovery circuits, and in particular to circuits for recovering energy that would otherwise be dissipated as heat in a switching aid network (snubber) during a forced commutation process where an outgoing semiconductor switching device of an electronic commutator circuit is commutated entirely by gate control.

BACKGROUND OF THE INVENTION

British Patent Application No. 2,433,360 discloses an electronic commutator circuit for use with a stator winding of an electrical machine. The stator winding includes a number of coils linked by the same number of points of common coupling. The electronic commutator circuit includes the same number of switching stages with each switching stage being connected between a respective one of the points of common coupling and first and second dc lines. Each switching stage includes a first reverse blocking semiconductor power device capable of being turned on and off by gate control having its anode connected to the first dc line and a second reverse blocking semiconductor power device capable of being turned on and off by gate control having its cathode connected to the second dc line.

A preferred type of semiconductor power device is the Reverse Blocking Gate Turn Off Thyristor (RB-GTO) or RB-GTO derivative because they benefit from reduced on-state losses relative to other gate commutated device families such as Insulated Gate Bipolar Transistors (IGBTs) as a result of their internal regenerative properties.

The reverse blocking semiconductor power devices are used in place of conventional thyristors and this means that the electronic commutation circuit can force the commutation of current irrespective of the voltage in the stator winding.

The electric commutator circuit may also include a switching aid network (snubber) connected in parallel with each of the semiconductor power devices. The snubber may be a series connected resistor-capacitor or configured according to the well known industry standard "RCD Polarized Snubber" as shown in the figures of British Patent Application No. 2,433,360. The purpose of either type of snubber is to assist the forced commutation process and reducing switching losses in the power semiconductor devices. However, the dissipation of energy within the snubber when the outgoing RB-GTO is switched during a forced commutation process represents an appreciable energy loss and reduces the overall efficiency of the electronic commutator circuit.

SUMMARY OF THE INVENTION

The present invention provides a way of recovering the energy that would otherwise be dissipated within the switching aid network (snubber) and returning it to another part of the electrical system or dissipating it elsewhere where the heat can be more easily managed. More particularly, the present invention provides a circuit for use with a stator winding of an electrical machine, the stator winding including a number of coils linked by the same number of points of common coupling, the circuit comprising:

an electronic commutator circuit having the same number of switching stages, each switching stage being connected between a respective one of the points of common coupling and first and second main dc lines and including:
  a first reverse blocking semiconductor power device capable of being turned on and off by gate control having its cathode connected to the first main dc line; and
  a second reverse blocking semiconductor power device capable of being turned on and off by gate control having its anode connected to the second main dc line;
a voltage clamping circuit including:
  the same number of clamping stages, each clamping stage being connected between a respective one of the points of common coupling and first and second auxiliary dc lines and including a first diode having its cathode connected to the first auxiliary dc line, and a second diode having its anode connected to the second auxiliary dc line;
  a first capacitor connected between the first main dc line and the first auxiliary dc line; and
  a second capacitor connected between the second main dc line and the second auxiliary dc line; and
means for selectively discharging the first and second capacitors.

An advantage of the present invention is that the first and second capacitors of the voltage clamping circuit are shared by all of the individual clamping stages. The diodes of the clamping stages effectively replace the switching aid network and snubber components of a conventional electronic commutator circuit. The voltage clamping and energy recovery circuit of the present invention therefore has relatively few electrical components, which means lower hardware costs and improved reliability.

The first and second capacitors can be selectively discharged (preferably through an essentially lossless discharge path) to any suitable part of the electrical system associated with the electrical machine or to another part of the system. The means for selectively discharging the first and second capacitors is preferably an energy recovery circuit for recovering the energy stored in the first and second capacitors. It is generally preferred that the energy recovery circuit includes a dc to dc converter means for selectively discharging the first capacitor to one of the first and second main dc lines and selectively discharging the second capacitor to the other of the first and second main dc lines. For example, the first capacitor arranged between the first main dc line and the first auxiliary dc line may be selectively discharged to the first main dc line or the second main dc line depending on the dc voltage polarity.

The voltage clamping circuit may further include a third capacitor connected between the first and second auxiliary dc lines.

The voltage clamping circuit may further include a plurality of first capacitors connected between the first main dc line and the first auxiliary dc line and a plurality of second capacitors connected between the second main dc line and the second auxiliary dc line.

The circuit will usually include first and second dc terminals; the first dc terminal being connected to the first main dc line and the second dc terminal being connected to the second main dc line. In cases where the electrical machine may be used in a generating mode, the circuit will preferably include a series connected thyristor and resistor connected between the first and second dc terminals.

In a first arrangement the dc to dc converter means may include a first semiconductor power device and a first inductor connected in series between the first auxiliary dc line and the second main dc line, a second semiconductor power device and a second inductor connected in series between the second auxiliary dc line and the first main dc line, and a third semiconductor power device having its cathode connected to a junction between the first semiconductor power device and the first inductor and its anode connected to a junction between the second semiconductor power device and the second inductor. The anode of the first semiconductor power device of the dc to dc converter means is preferably connected to the first auxiliary dc line and the cathode of the second semiconductor power device of the dc to dc converter means is preferably connected to the second auxiliary dc line.

In a second arrangement the dc to dc converter means may include a first semiconductor power device and a first inductor connected in series between the first auxiliary dc line and the first main dc line, a second semiconductor power device and a second inductor connected in series between the second auxiliary dc line and the second main dc line, and a third semiconductor power device having its cathode connected to a junction between the first semiconductor power device and the first inductor and its anode connected to a junction between the second semiconductor power device and the second inductor. The anode of the first semiconductor power device of the dc to dc converter means is preferably connected to the first auxiliary dc line and the cathode of the second semiconductor power device of the dc to dc converter means is preferably connected to the second auxiliary dc line.

The third semiconductor power device of the first and second arrangements of the dc to dc converter means may be a diode or a thyristor depending on the intended operating modes of the electrical machine. For example, if the electrical machine is designed to operate in a motoring mode only then the third semiconductor power device will normally be a diode and will not need a gate control signal. However, if the electrical machine will also operate in a generating mode (even if this is only for short periods of time) then the third semiconductor power device will normally be a thyristor and will need a gate control signal.

In a third arrangement (where the electrical machine is designed to operate in both motoring and generating modes) the dc to dc converter means may include a first inductor connected to the second main dc line, a second inductor connected to the first main dc line, a first semiconductor power device connected between the first auxiliary dc line and the first inductor, a second semiconductor power device connected between the second auxiliary dc line and the second inductor, a third semiconductor power device connected between the first auxiliary dc line and the second inductor, a fourth semiconductor power device connected between the second auxiliary dc line and the first inductor, a fifth semiconductor power device having its cathode connected to a junction between the first semiconductor power device and the first inductor and its anode connected to a junction between the second semiconductor power device and the second inductor, and a sixth semiconductor power device having its cathode connected to a junction between the second semiconductor power device and the second inductor and its anode connected to a junction between the fourth semiconductor power device and the first inductor. The anodes of the first and third semiconductor power devices of the dc to dc converter means are preferably connected to the first auxiliary dc line and the cathodes of the second and fourth semiconductor power devices of the dc to dc converter means are preferably connected to the second auxiliary dc line. The fifth and sixth semiconductor power devices of the dc to dc converter means are preferably thyristors.

It can be advantageous in some circumstances if the dc to dc converter means of the energy recovery circuit is a resonant dc to dc converter means. In a fourth (resonant) arrangement the dc to dc converter means may include a first inductor and a first capacitor connected in series between the first auxiliary dc line and the second main dc line, a second inductor and a second capacitor connected in series between the second auxiliary dc line and the first main dc line, a first semiconductor power device and a third inductor connected in series between the first auxiliary dc line and a junction between the first inductor and the first capacitor such that the first semiconductor power device and the third inductor are connected in parallel with the first capacitor, a second semiconductor power device and a fourth inductor connected in series between the second auxiliary dc line and a junction between the second inductor and the second capacitor such that the second semiconductor power device and the fourth inductor are connected in parallel with the second capacitor, and a third semiconductor power device having its cathode connected to the junction between the first inductor and the first capacitor and its anode connected to the junction between the second inductor and the second capacitor.

In the fourth arrangement of the dc to dc converter:
the anode of the first semiconductor power device can be connected to the third inductor and the cathode of the first semiconductor power device can be connected to the junction between the first inductor and the first capacitor; or
the cathode of the second semiconductor power device can be connected to the second auxiliary dc line and the anode of the second semiconductor power device can be connected to the fourth inductor; and
the anode of the first semiconductor power device can be connected to the first auxiliary dc line and the cathode of the first semiconductor power device can be connected to the third inductor; or
the cathode of the second semiconductor power device can be connected to the fourth inductor and the anode of the second semiconductor power device can be connected to the junction between the second inductor and the second capacitor.

In a fifth arrangement the energy recovery circuit may include a first dc to dc converter means for selectively discharging the first capacitor to one of the first and second main dc lines and a second dc to dc converter means for selectively discharging the second capacitor to the other of the first and second main dc lines. The first dc to dc converter means may include a first semiconductor power device and a first inductor connected in series between the first auxiliary dc line and the second main dc line and a second semiconductor power device having its cathode connected to the junction between the first semiconductor power device and the first inductor and its anode connected to the second main dc line. Similarly, the second dc to dc converter means may include a first semiconductor power device and a first inductor connected in series between the second auxiliary dc line and the first main dc line and a second semiconductor power device having its anode connected to the junction between the first semiconductor power device and the first inductor and its cathode connected to the first main dc line. In both cases, the second semiconductor power device can be a diode or a thyristor, depending on whether electrical machine is designed to operate in a motoring mode only.

It will be readily appreciated that, in practice, any suitable dc to dc converter means (both resonant and non-resonant) may be used and the present invention is not limited to the specific arrangements mentioned above.

Where appropriate, the semiconductor power devices can be controlled according to a pulse width modulation (PWM) strategy or a pulse period modulation (PPM) strategy, for example.

The present invention further provides an electrical machine comprising a moving part, a stator, a stator winding having a number of coils linked by the same number of points of common coupling and a circuit as described above, wherein each switching stage of the electronic commutator circuit is connected between a respective one of the points of common coupling and first and second main dc lines and each clamping stage of the voltage clamping circuit is connected between a respective one of the points of common coupling and the first and second auxiliary dc lines.

The electrical machine can be a rotating or linear electrical machine of any suitable type. The rotating or linear electrical machine can be excited by any suitable means and the type of excitation has no effect on the fundamental principles of operation and benefits of the energy recovery circuit. The circuit can therefore be used with synchronous machines with slip ring or brushless field systems, with conventional or high temperature superconducting or low temperature superconducting field windings, with permanent magnet rotors, in radial, axial and transverse flux orientation and in conventional, inside-out and double-sided configurations. The circuit can also be used with induction machines. A linear electrical machine could be used in applications that inherently benefit from reciprocating motion, for example wave power generators.

The rotating or linear electrical machine may be designed to operate in a motoring mode and/or a generating mode.

In the case of a rotating electrical machine, the moving part is normally referred to as the rotor and in the case of a linear electrical machine the moving part is normally referred to as the translator. Although the patent specification is generally written using rotating electrical machine terminology of rotor or stator, it will be readily appreciated that the circuits of the present invention are also applicable to other types of electrical machines for which the terminology may be different.

The voltage between the first and second auxiliary dc lines may be substantially constant for all operating conditions of the electrical machine or may vary according to the operating condition of the electrical machine.

The present invention further provides a method of recovering energy from an electronic commutator circuit for use with a stator winding of an electrical machine, the stator winding having a number of coils linked by the same number of points of common coupling, the electronic commutator circuit having the same number of switching stages, each switching stage being connected between a respective one of the points of common coupling and first and second main dc lines and including:
- a first reverse blocking semiconductor power device capable of being turned on and off by gate control having its cathode connected to the first main dc line; and
- a second reverse blocking semiconductor power device capable of being turned on and off by gate control having its anode connected to the second main dc line;

the method comprising the steps of:
  when one of the first or second reverse blocking semiconductor power devices of a switching stage is turned off by gate control, using the current flowing through said one of the first or second reverse blocking semiconductor power devices to charge a capacitor; and
  selectively discharging the capacitor.

The capacitor is preferably selectively discharged by an energy recovery circuit for recovering the energy stored in the capacitor. It is generally preferred that the energy recovery circuit includes a dc to dc converter means, which may be configured as described above. For example, the dc to dc converter means may be a resonant dc to dc converter means or specifically adapted depending on the intended operating modes of the electrical machine.

The capacitor may be selectively discharged to one of the first and second main dc lines or to another part of the system, for example.

The method may further include the step of monitoring the voltage on the capacitor to determine information about the operating characteristics of the electrical machine.

BRIEF DESCRIPTION OF THE DRAWINGS

Exemplary embodiments of the invention will now be described, with reference to the accompanying drawings, in which.

DETAILED DESCRIPTION OF THE PREFERRED EMBODIMENTS

Figure 1:
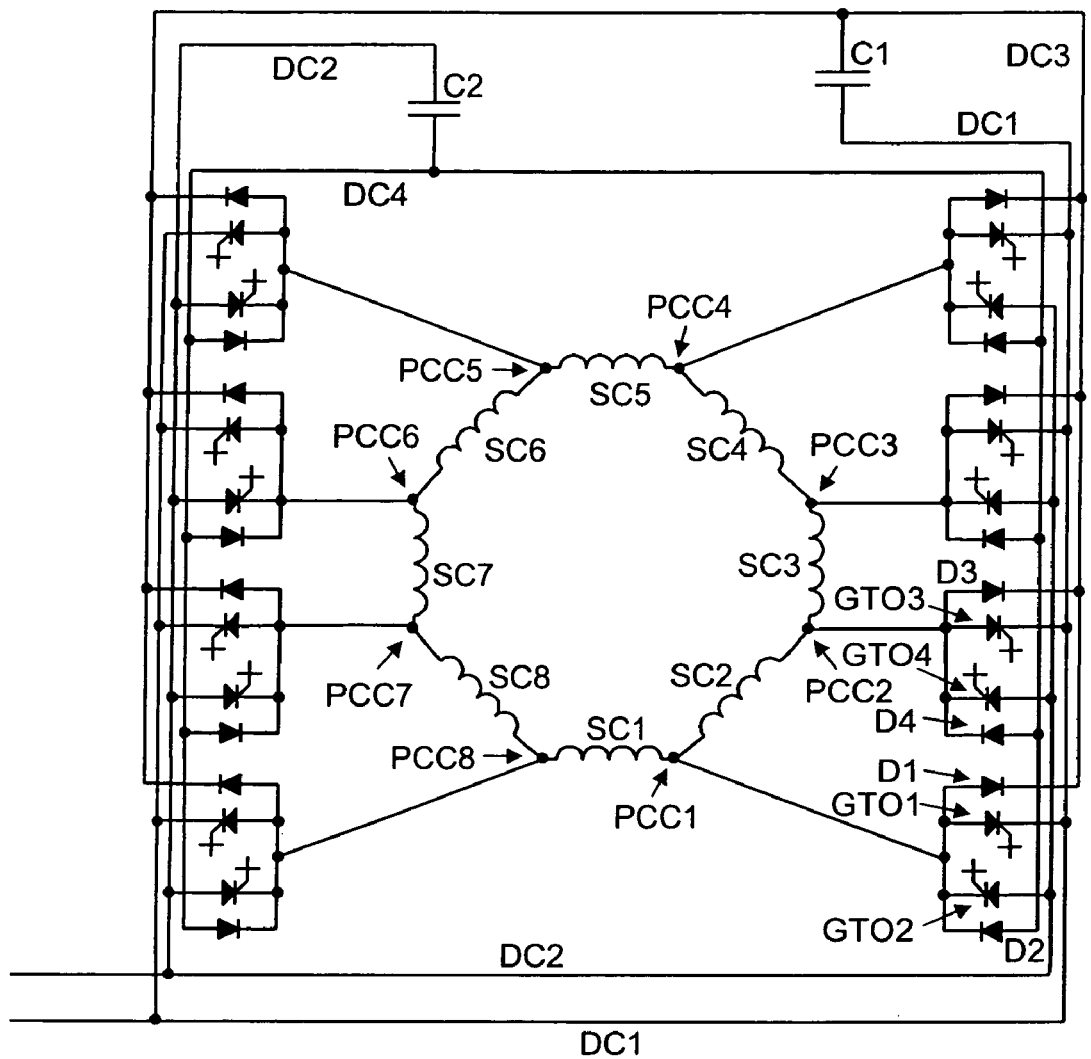
FIG. 1 is a schematic diagram showing a simplified version of the voltage clamping and energy recovery circuit of the present invention without a dc to dc converter.

As shown in FIG. 1, the stator winding of a rotating electrical machine includes eight series connected coils although it is likely that more would be used in practice. Each coil has an identical, but phase shifted, electromotive force (EMF) generated in it, due to the field and rotation of the rotor (not shown) of the electrical machine.

Each pair of adjacent coils is joined by a point of common coupling. It can be seen from FIG. 1 that a first coil SC1 is connected to a second coil SC2 and to a pair of Gate Turn Off Thyristor (GTO) switches GTO1 and GTO2 by means of a first point of common coupling PCC1. The cathode of switch GTO1 is connected to a first dc terminal by means of a first main dc line DC1 and the anode of switch GTO2 is connected to a second dc terminal by means of a second main dc line DC2. The second coil SC2 is connected to a third coil SC3 and to a pair of GTO switches GTO3 and GTO4 by means of a second point of common coupling PCC2. The cathode of switch GTO3 is connected to the first dc terminal by means of the first main dc line DC1 and the anode of switch GTO2 is connected to the second dc terminal by means of the second main dc line DC2. The remaining coils are connected to the first and second main dc lines DC1 and DC2 in a corresponding manner.

Each pair of GTO switches represents an individual switching stage of an electronic commutator circuit.

The first and second dc terminals are connected to a suitable dc supply (not shown) such as a thyristor bridge, matrix converter, battery or dc generator. In some cases a dc link inductor LDC will be required as shown in FIGS. 2 to 8 as the converter will normally run in a constant current mode.

Figure 2:
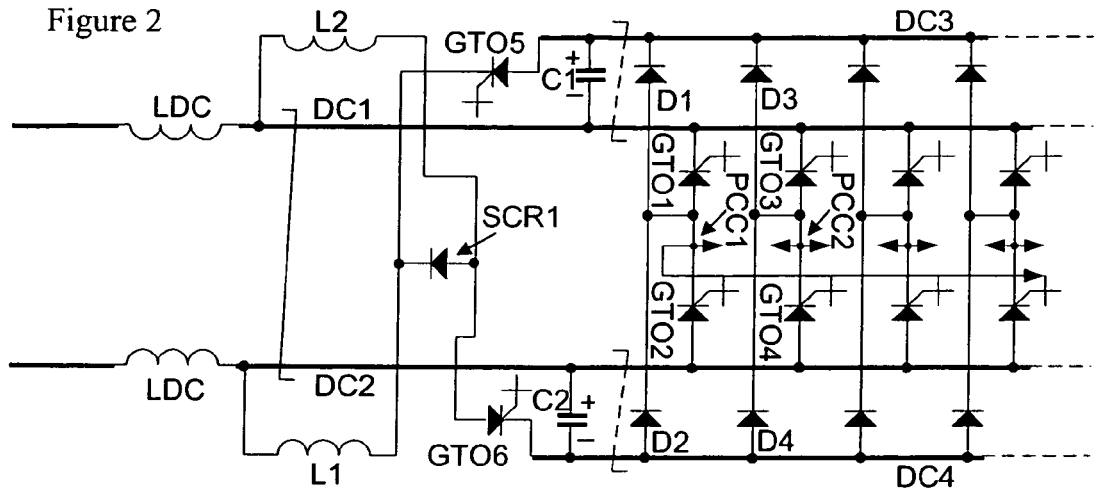
FIG. 2 is a schematic diagram showing a first voltage clamping and energy recovery circuit having a dc to dc converter that is specifically adapted for an electrical machine that operates in a motoring mode only.

In FIG. 2 the series connected coils of the stator winding have been omitted to improve clarity but it will be readily appreciated that they extend between the points of common coupling. In other words, the second coil SC2 will extend between the first point of common coupling PCC1 associated with switches GTO1 and GTO2 and the second point of common coupling PCC2 associated with switches GTO3 and GTO4.

During operation of the electrical machine, dc current flows into the stator winding at a first point in the circular array and flows out of the stator winding at a second point in the circular array. The second point is displaced approximately 180 electrical degrees from the first point. The winding current therefore diverges into two approximately equal paths at the first point and recombines at the second point. In order to effect commutation, the location of the first point or the second point must be indexed one step along the array. The GTO switches are commutated entirely by gate control as described in more detail in British Patent Application No. 2,433,360 with current flowing in an outgoing GTO switch being diverted into an incoming GTO switch.

A voltage clamping and energy recovery circuit provides three additional functions, namely (i) an alternative path for any current flowing in the outgoing GTO switch when it is turned off (i.e., a conventional switching aid network (snubber) action); (ii) a voltage clamping action on the voltage that may be created when the outgoing GTO switch is turned off; and (iii) an efficient means of storing the energy that would normally be dissipated in a conventional snubber, making it possible to return that energy to some other part of the electrical system. As shown in FIGS. 1 and 2, each point of common coupling is connected to a pair of diodes. The first point of common coupling PCC1 is connected to a pair of diodes D1 and D2. The cathode of diode D1 is connected to a first auxiliary dc line DC3 and the anode of diode D2 is connected to a second auxiliary dc line DC4. The second point of common coupling PCC2 is connected to a pair of diodes D3 and D4. The cathode of diode D3 is connected to the first auxiliary dc line DC3 and the anode of diode D4 is connected to the second auxiliary dc line DC4. The remaining points of common coupling are connected to the first and second auxiliary dc lines DC3 and DC4 in a corresponding manner.

Each pair of diodes represents an individual clamping stage of the voltage clamping and energy recovery circuit and ideally replaces the conventional switching aid network (snubber) components associated with GTO devices. However, practical considerations of allowing for parasitic inductance in the voltage clamping circuit mean that a small snubber (not shown) may still be required for each of the GTO devices. This small snubber will have smaller losses than the conventional snubber without the voltage clamping and energy recovery circuit. For the general case where the stator winding of the electrical machine has n series connected coils with n points of common coupling, it will be readily appreciated that the electronic commutator circuit has n switching stages and the energy recovery circuit has n clamping stages.

The voltage clamping and energy recovery circuit also includes a first capacitor C1 connected between the first main dc line DC1 and the first auxiliary dc line DC3 and a second capacitor C2 connected between the second main dc line DC2 and the second auxiliary dc line DC4. The voltage between the first and second auxiliary dc lines DC3 and DC4 will always be greater than, or equal to, the dc voltage between the first and second main dc lines DC1 and DC2 and is symmetrical about that dc voltage for normal firing patterns. It is therefore possible to feed the energy that is recovered and stored in the first and second capacitors C1 and C2 back to the main dc supply or some other part of the electrical system. In a conventional electrical commutator circuit, this energy would have been dissipated in the switching aid network (snubber).

FIG. 2 shows one possible arrangement for a dc to dc converter for discharging the first and second capacitors C1 and C2 that can be used when the electrical machine is designed to operate in a motoring mode only. The dc to dc converter forms part of the energy recovery circuit and provides a means of discharging the first and second capacitors C1 and C2 to the second and first main dc lines DC2 and DC1, respectively. More particularly, the dc to dc converter of FIG. 2 includes a first GTO switch GTO5 and a first inductor L1 connected in series between the first auxiliary dc line DC3 and the second main dc line DC2. The anode of the switch GTO5 is connected to the first auxiliary dc line DC3 and the cathode is connected to the first inductor L1. The dc to dc converter also includes a second GTO switch GTO6 and a second inductor L2 connected in series between the second auxiliary dc line DC4 and the first main dc line DC1. The cathode of the switch GTO6 is connected to the second auxiliary dc line DC4 and the anode is connected to the second inductor L2. Finally, the dc to dc converter includes a diode SCR1 having its cathode connected to the junction between the first switch GTO5 and the first inductor L1 and its anode connected to the junction between the second switch GTO6 and the second inductor L2. Although not shown, a further capacitor can also be connected between the first and second auxiliary dc lines DC3 and DC4. This is a preferred arrangement in the case where the first and second capacitors C1 and C2 are distributed or multiple capacitors, but it will be readily appreciated that the dc to dc converter is common to all capacitors. Such an arrangement assists with reducing the effect of parasitic inductances within the voltage clamping circuit.

Basic operation of the overall circuit can be understood with reference to FIG. 1. In normal operation in a motoring mode, current will flow from the second dc terminal along the second main dc line DC2 and into the stator winding at a first point through the associated GTO switch that is turned on by gate control. The winding current diverges into two approximately equal paths at the first point and recombines at a second point that is approximately 180 electrical degrees from the first point. The current flows out of the stator winding at the second point through the associated GTO switch that is also turned on and along the first main dc line DC1 to the first dc terminal. For example, current may flow into the stator winding at the fifth point of common coupling PCC5 through the associated GTO switch and out of the stator winding at the first point of common coupling PCC1 through switch GTO1 with part of the current flowing anti-clockwise as shown in FIG. 1 through coils SC6, SC7, SC8 and SC1 and the other part of the current flowing clockwise through coils SC5, SC4, SC3 and SC2.

The vector sum of the individual coil EMFs will charge the first capacitor C1 to a peak dc voltage Vp and the second capacitor C2 to a negative dc peak voltage −Vp. Each GTO device is operated under phase control, by which it is turned on with a gate signal some time after the voltage across it changes polarity due to the machine EMF from negative to positive. This time period is usually expressed as an angle relative to the electrical period and is commonly referred to as the firing angle.

When the electrical machine is operating in a motoring mode, the voltage in the first main dc line DC1 will be negative with respect to the second main dc line DC2. When the electrical machine is operating in a generating mode, the voltage in the first main dc line DC1 will be positive with respect to the second main dc line DC2. If V1 represents the voltage in the first main dc line DC1, V2 represents the voltage in the second main dc line DC2, V3 represents the voltage in the first auxiliary dc line DC3 and V4 represents the voltage in the second auxiliary dc line DC4, then the ratio k can be defined as:

$$k=(V1-V2)/(V3-V4)$$

The ratio k is dependent on the firing angle and lies between −1 (motoring) and +1 (generating), while no energy is being transferred into the voltage clamping circuit from switching events. The action of the voltage clamping circuit influences the actual working value of Vp, which is greater than the value set by k alone. For the purposes of the following discussion, it will be assumed that since the energy recovery circuit is symmetrical, the peak voltage Vp and all other voltages are considered with respect to the midpoint of the circuit.

Figure 3A:
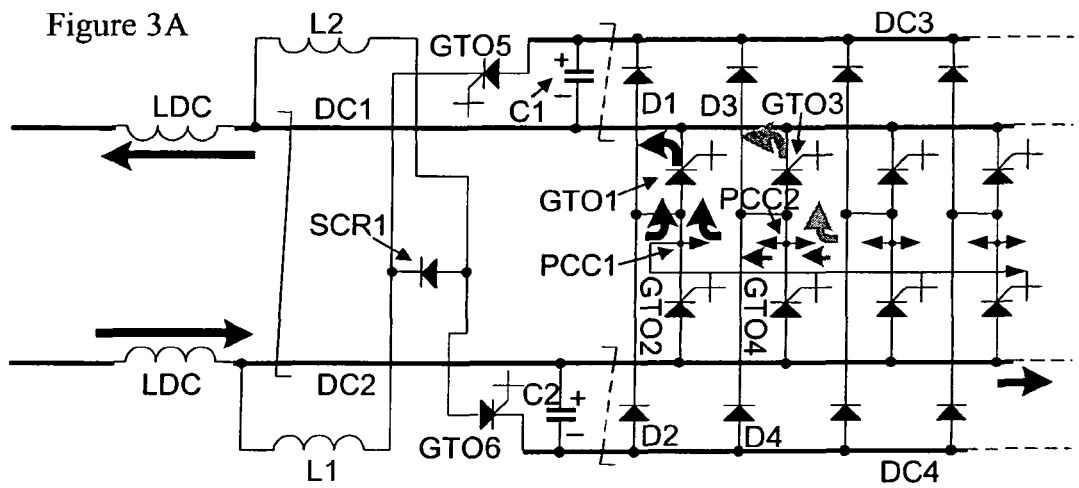
FIGS. 3A to 3C are schematic diagrams showing a commutation, voltage clamping and energy recovery process for motoring applications.
Figure 3B:
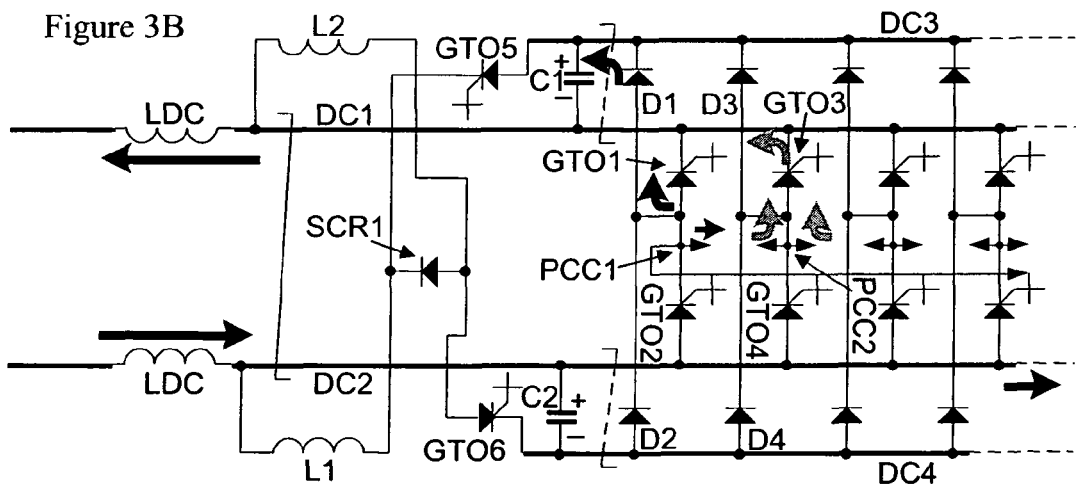
Figure 3C:
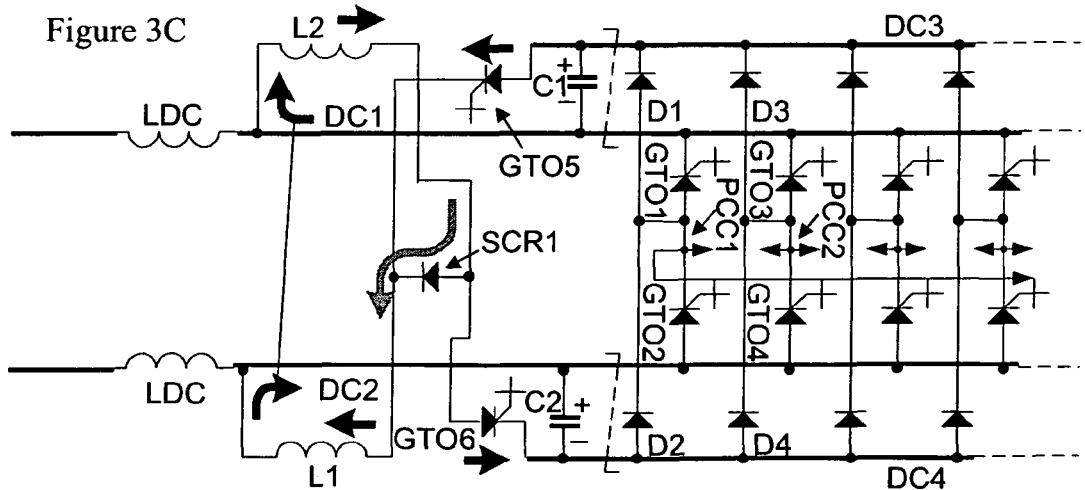

Operation of the voltage clamping and energy recovery circuit of FIG. 2 will now be described with reference to FIGS. 3A to 3C.

If the indexing is such that current is to commutate from the switch GTO1 (i.e., the outgoing switch) to switch GTO3 (i.e., the incoming switch) such that the current will change from leaving the stator winding at the first point of common coupling PCC1 to leaving the stator winding at the second point of common coupling PCC2 (with appropriate similar indexing taking place for the current flow into the stator winding), then the EMF of the electrical machine must cause a forward voltage to be present across the incoming switch GTO3. The current flow at the start of a commutation process (i.e., before the incoming switch GTO3 is turned on by gate control) is illustrated in FIG. 3A by the dark grey arrows.

When the incoming switch GTO3 turns on, the forward voltage is of the correct polarity and tends to reverse the current in the second coil SC2 (FIG. 1) between the first point of common coupling PCC1 and the second point of common coupling PCC2. This will increase the current flowing in the incoming switch GTO3 and reduce the current flowing in the outgoing switch GTO1. The current flowing immediately after the incoming switch GTO3 is turned on by gate control is illustrated in FIG. 3A by the light grey arrows. At some point during the commutation process, the outgoing switch GTO1 will be turned off by gate control. The current that was flowing from the first point of common coupling PCC1 through the outgoing switch GTO1 will now flow through the diode D1 and into the first capacitor C1 which is at the peak voltage Vp. The size of the first capacitor C1 is sufficiently large that the current does not substantially change the peak voltage Vp. The peak current in the diode D1 is the peak current to be turned off in the outgoing switch GTO1 and under fault conditions this can be the full dc link current. The flow of diode current from the first point of common coupling PCC1 to the first capacitor C1 is illustrated in FIG. 3B by the dark grey arrows. The second point of common coupling PCC2 is connected to the first main dc line DC1 through the incoming switch GTO3 which is at k*Vp. This means that the voltage across the outgoing switch GTO1 is now (k−1)*Vp forcing the current reversal in the second coil SC2 to complete as indicated by the dark grey arrow of FIG. 3B which shows current flowing from the first point of common coupling PCC1 to the second point of common coupling PCC2. This causes the diode current to fall to zero and turn off. Thus, it will be readily appreciated that the near constant voltage of the first capacitor C1 assists with the overall commutation process and limits the voltage stress experienced by the outgoing switch GTO1. The light grey arrows of FIG. 3B illustrate the flow of current through the incoming switch GTO3 once the outgoing switch GTO1 is turned off. This overall commutation action will incrementally pump up the peak voltage Vp at each indexing event.

The above description is directed solely to the indexing of the dc current flowing out of the stator winding. However, it will be readily appreciated that corresponding indexing must also take place for the dc current flowing into the stator winding. The indexing of the dc current flowing into the stator winding may take place at the same time as the indexing of the dc current flowing out of the stator winding or at a different time depending on the particular configuration. For the example given above, where the indexing is such that current will change from leaving the stator winding at the first point of common coupling PCC1 to leaving the stator winding at the second point of common coupling PCC2, then corresponding indexing will be such that current will change from entering the stator winding at the fifth point of common coupling PCC5 to entering the stator winding at the sixth point of common coupling PCC6. Thus, the GTO switch associated with the fifth point of common coupling PCC5 will be the outgoing switch, and the GTO switch associated with the sixth point of common coupling PCC6 will be the incoming switch. However, for the purposes of the following description, it is more convenient to consider a completely separate indexing event where the switch GTO2 is the outgoing switch, and the switch GTO4 is the incoming switch.

The indexing is similar to that described above but of the opposite polarity. At the start of the commutation process the incoming switch GTO4 is forward biased and can be turned on by gate control. The forward bias voltage tends to reverse the current in the second coil SC2 (FIG. 1) between the first point of common coupling PCC1 and the second point of common coupling PCC2. At some point during the commutation process, the outgoing switch GTO2 will be turned off by gate control. Any shortage of current at the first point of common coupling PCC1 will flow through the diode D2 from the second capacitor C2 which is at the negative peak voltage −Vp. The second point of common coupling PCC2 is connected to the second main dc line DC2 through the incoming switch GTO4 which is at −k*Vp. This means that the voltage across the outgoing switch GTO2 is now (k−1)*Vp forcing the current reversal in coil SC2 to complete.

To avoid the peak voltage Vp becoming too large, the first and second capacitors C1 and C2 are periodically and simultaneously discharged. This is achieved by turning on the first and second switches GTO5 and GTO6 of the dc to dc converter by gate control such that current builds up in the first and second inductors L1 and L2 which each have a voltage across them that is equal to (I-k)*Vp (neglecting the effects of indexing events pumping up this voltage and the periodic discharge of the first and second capacitors C1 and C2). When the peak voltage Vp has dropped sufficiently, the first and second switches GTO5 and GTO6 are turned off by gate control. This causes the voltage across both inductors L1 and L2 to reverse so that the diode SCR2 becomes forward biased and turns on. The current in the series-connected circuit of the first inductor L1, the diode SCR1 and the second inductor L2 decays and, when it reaches zero, the diode SCR1 turns off, thereby restoring the circuit to the original state.

Monitoring of the voltage on the first and second capacitors C1 and C2 can provide useful information about the operating characteristics and state of the electrical machine. Such information might include the EMF that is being generated in the stator winding and confirmation that the GTO switches of the individual switching stages are conducting current properly. The information could be used to assist in the control of the electrical machine and/or the overall system of which the electrical machine is a part.

The period between discharges of the first and second capacitors C1 and C2 is not critical to the operation of the circuit and may be a multiple or sub-multiple of the switching frequency for the main GTO devices, for example. The period between discharges does, however, affect the required size of the first and second capacitors C1 and C2 because of the requirement that the voltage on the capacitors should not change substantially. For example, a 10% duty cycle for the first and second switches GTO5 and GTO6 at full load allows the values of the first and second inductors L1 and L2 to be selected. The preferred duty cycle allows the current in the first and second inductors L1 and L2 to reach zero within the switching period, to reduce the demands on the diode SCR1. Higher duty cycles within the preferred range will reduce the peak current requirement for the first and second switches GTO5 and GTO6 but will reduce the time available for the reverse recovery of diode SCR1.

Figure 4:
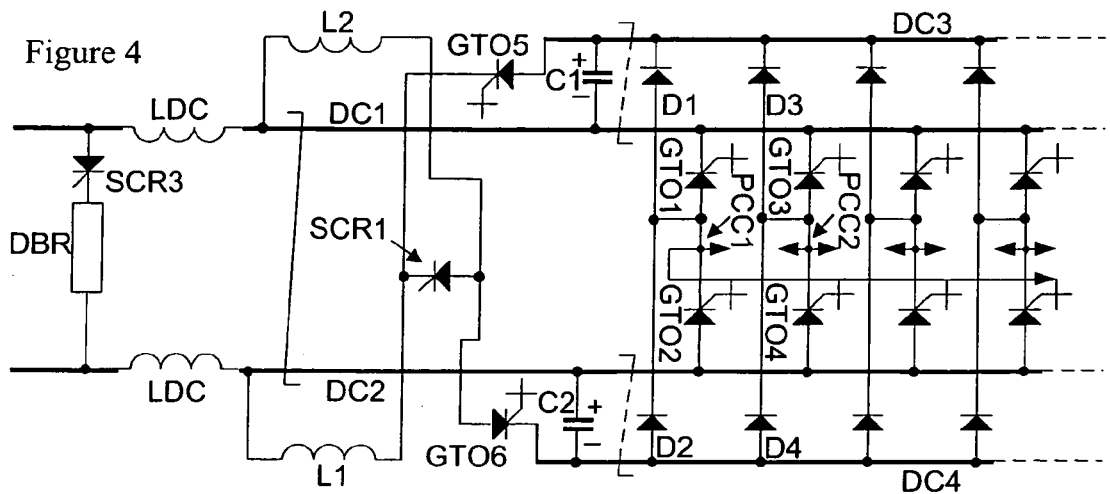
FIG. 4 is a schematic diagram showing a second voltage clamping and energy recovery circuit having a dc to dc converter that is specifically adapted for an electrical machine that operates normally in a motoring mode, but may occasionally be required to operate in a generating mode.

It will be readily appreciated that the dc to dc converter of FIG. 2 is to be used when the electrical machine is designed to operate in a motoring mode only. FIG. 4 therefore shows an alternative arrangement for a dc to dc converter that can be used to discharge the first and second capacitors C1 and C2 when the electrical machine is designed to operate normally in a motoring mode, but may occasionally be required to operate in a generating mode. In this case, the diode SCR1 has been replaced by a thyristor (which is also labelled SCR1) and a series connected thyristor SCR3 and resistor DBR are connected between the first and second dc terminals to provide for motor braking if the supply converter is unable to regenerate into the supply network. This is common practice with marine propulsion drives where the resistor is known as a dynamic braking resistor (DBR) and the electrical machine operates for most of the time as a motor rather than a generator. When the electrical machine changes from a motoring mode to a generating mode, the polarity of the first and second main dc lines DC1 and DC2 is reversed. Before this reversal takes place, the gate control signal applied to the thyristor SCR1 and the first and second switches GTO5 and GTO6 must be removed, and the current in the first and second inductors L1 and L2 must be allowed to fall to zero, so that the thyristor SCR1 can recover and block forward voltage. In this state, it is no longer possible to discharge the first and second capacitors C1 and C2 so the main GTO devices should be run as naturally commutated thyristors, maintaining the gate drive to each of the main GTO devices that is turned on until the anode current has reached zero. The firing angle of the main GTO devices is also advanced when the electrical machine changes from a motoring mode to a generating mode.

Figure 5:
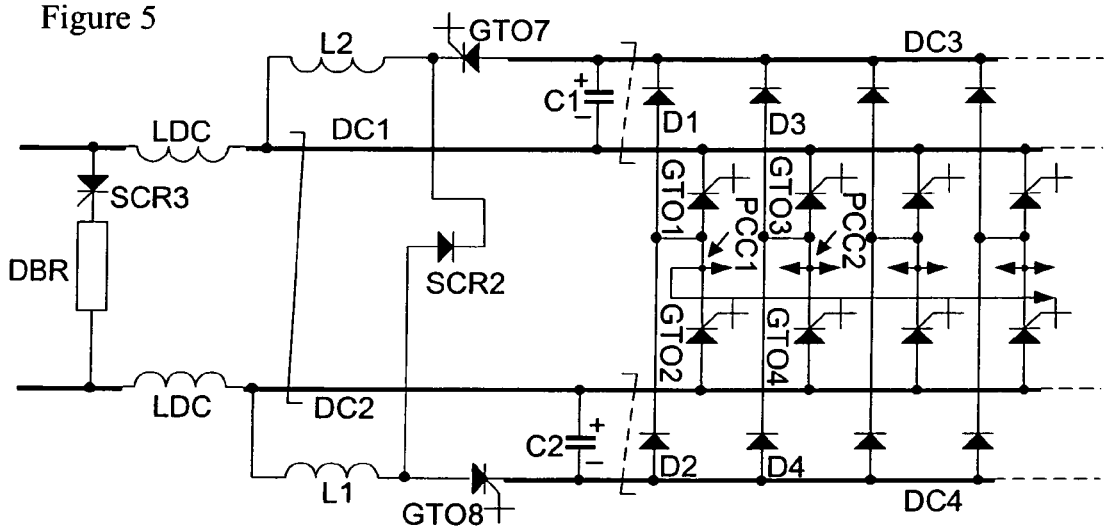
FIG. 5 is a schematic diagram showing a third voltage clamping and energy recovery circuit having a dc to dc converter that is specifically adapted for an electrical machine that operates normally in a generating mode.

FIG. 5 shows one possible arrangement for a dc to dc converter that can be used when the electrical machine is designed to operate normally in a generating mode. It will be readily appreciated that the voltage clamping and energy recovery circuit is less important for generating applications since the turn off control of the outgoing GTO switch can be delayed until the current in that GTO switch has fallen to zero with only a minimal effect on performance. In this case, there is no excess current to pump up the first and second capacitors C1 and C2.

If the outgoing GTO switch is turned off by gate control while still carrying current, the first and second capacitors C1 and C2 will be pumped up as described above. The reversal of voltage polarity between the first and second main dc lines DC1 and DC2 must be allowed for and so the first and second capacitors C1 and C2 must be discharged to the main dc line that is opposite to that used for the motoring mode. However, the overall operation of the dc to dc converter of FIG. 5 is functionally equivalent to that described above with reference to FIGS. 3A to 3C.

Figure 6:
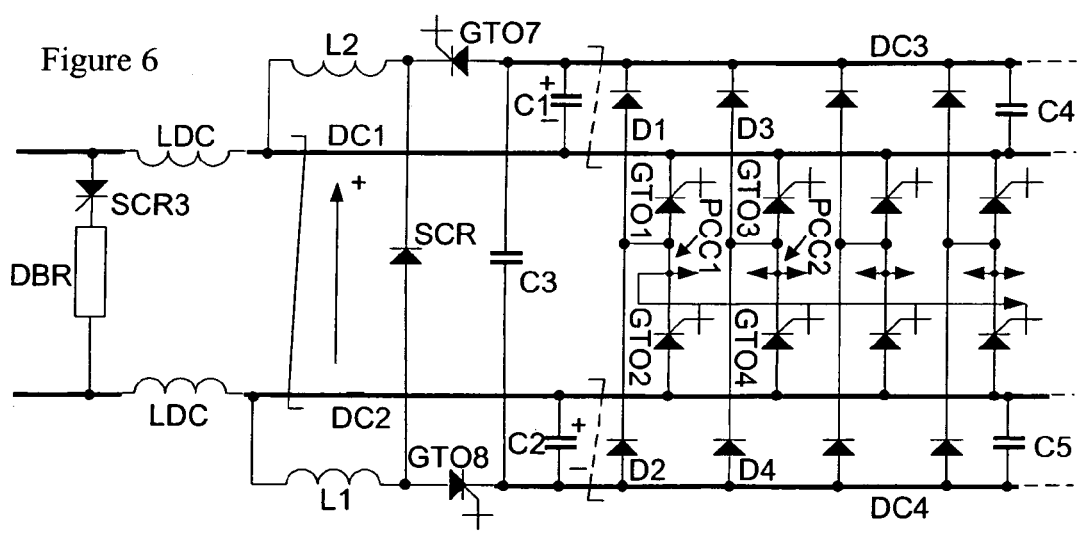
FIG. 6 is a schematic diagram showing a fourth voltage clamping and energy recovery circuit having multiple capacitors and a dc to dc converter that is specifically adapted for an electrical machine that operates normally in a generating mode.

FIG. 6 shows an arrangement based on FIG. 5 where a third capacitor C3 is connected between the first and second auxiliary dc lines DC3 and DC4. Additional capacitors C4 and C5 are also connected between the first auxiliary dc line DC3 and the first main dc line DC1 and between the second auxiliary dc line DC4 and the second main dc line DC2, respectively. The voltage clamping and energy recovery circuit of FIG. 6 therefore includes distributed or multiple capacitors. However, it will be readily appreciated that all of the capacitors C1 to C5 are shared by a single dc to dc converter, which in the arrangement of FIG. 6 is the same as the dc to dc converter of FIG. 5. The arrangement still has relatively few electrical components, which means lower hardware costs and improved reliability. It will be readily appreciated that this particular arrangement of capacitors can be applied to any of the other voltage clamping and energy recovery circuits described herein.

Figure 7:
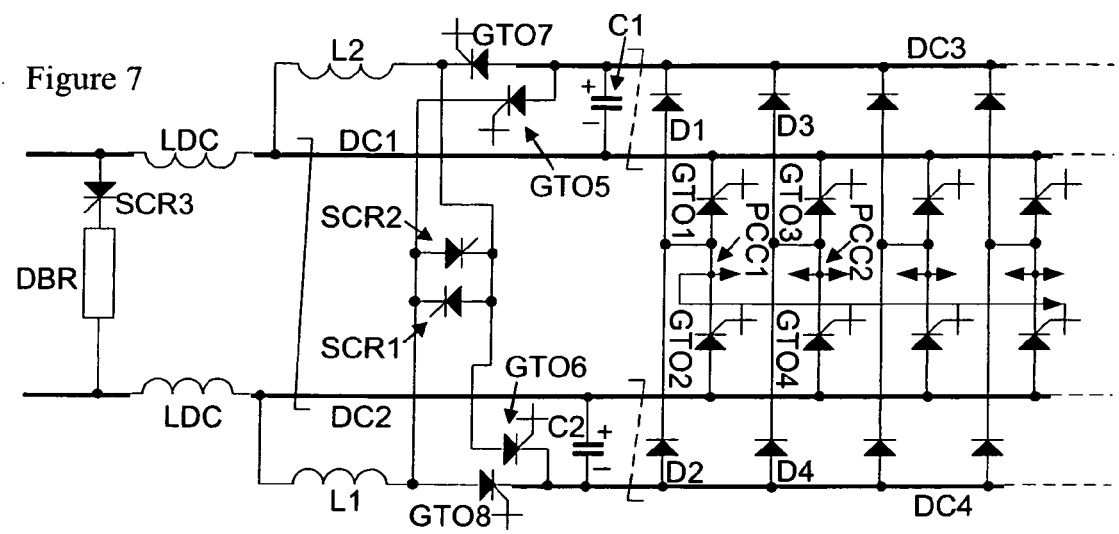
FIG. 7 is a schematic diagram showing a fifth voltage clamping and energy recovery circuit having a dc to dc converter that is specifically adapted for an electrical machine that can operate in both motoring and generating modes.

FIG. 7 shows one possible arrangement for a dc to dc converter that can be used when the electrical machine is designed to operate in both motoring and generating modes. The dc to dc converter is effectively a combination of those shown in FIGS. 2 and 5 for the motoring and generating modes, respectively. However, the diodes SCR1 and SCR2 are replaced by thyristors (which are also labelled SCR1 and SCR2) that can be turned on and off by gate control for the motoring or generating mode as appropriate.

Figure 8:
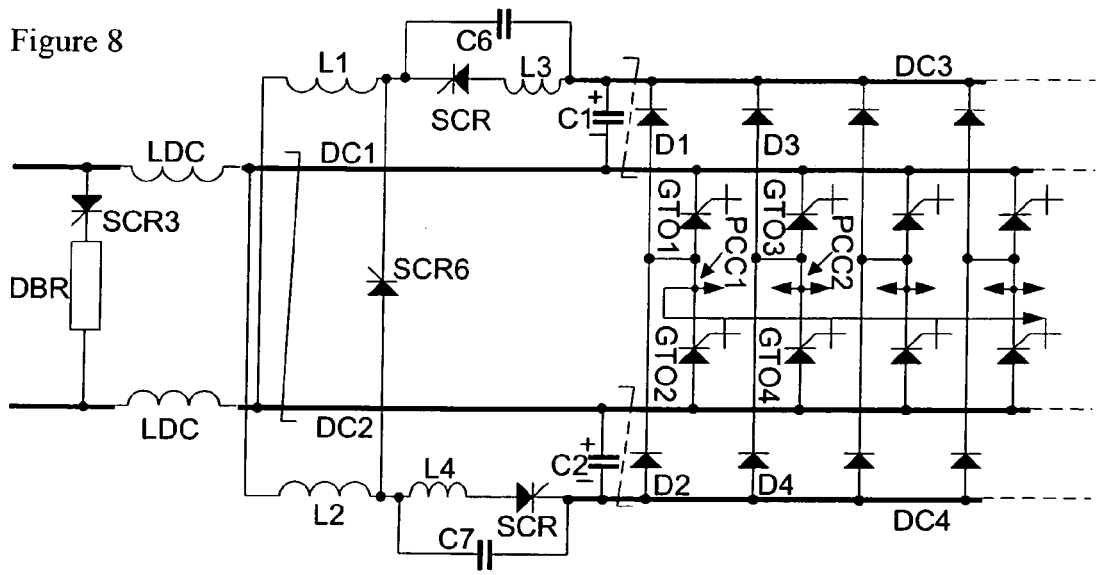
FIG. 8 is a schematic diagram showing a sixth voltage clamping and energy recovery circuit having a resonant dc to dc converter that is specifically adapted for an electrical machine that operates normally in a motoring mode, but may occasionally be required to operate in a generating mode.

FIG. 8 shows an alternative resonant dc to dc converter that can be used when the electrical machine is designed to operate normally in a motoring mode. The electrical machine can operate as a generator when the main GTO devices are run as naturally commutated thyristors, maintaining the gate drive to each of the main GTO devices that is turned on until the anode current has reached zero. It will be readily appreciated that such a circuit would need to dissipate energy in the DBR shown in FIG. 8 in order to provide a braking effort. The use of a resonant dc to dc converter allows the control of the energy recovery circuit to be further simplified. The first switch GTO5 is replaced by a thyristor SCR4 that is turned off automatically when the parallel connected capacitor C6 causes thyristor SCR4 to become reverse biased. Similarly, the second switch GTO6 is replaced by a thyristor SCR5 that is turned off automatically when the parallel connected capacitor C7 causes thyristor SCR5 to become reverse biased. Inductors L3 and L4 are connected in series with thyristors SCR4 and SCR5 (and in parallel with the capacitors C6 and C7), respectively, and have small inductances compared to the first and second inductors L1 and L2. A thyristor SCR6 is connected between the junction of the thyristor SCR4 and the first inductor L1 and the junction of the thyristor SCR5 and the second inductor L2. If the electrical machine is only going to be used in a motoring mode, then the thyristor SCR6 could be replaced by a simple diode. It is assumed that thyristor SCR6 will be gated on whenever the electrical machine is operating in a motoring mode so it will behave like a diode in the following description.

When thyristor SCR4 is turned on by gate control to discharge the first capacitor C1 of the voltage clamping circuit, the current flowing through it is, by principle of superposition, the current that would flow in the previous (non-resonant) dc to dc converter for motoring applications plus the sinusoidal resonant current due to the capacitor C6 and the inductor L3 being shorted with an initial charge on the capacitor C6. The first of these currents will also be slightly modified by the fact that the relevant inductance is the sum of the inductances of the two inductors L1 and L3 but this is dominated by the larger inductance of the first inductor L1. With the correct choice of component values, the sinusoidal current through the capacitor C6 will be sufficiently large to cause the total current through the thyristor SCR4 to attempt to go negative, which will automatically cause the thyristor SCR4 to turn off. The current that has been established in the first inductor L1 (and in a similar way in the second inductor L2 when the thyristor SCR5 is turned on by gate control to discharge the second capacitor C2 of the voltage clamping circuit) will continue to flow and is supplied by the charging of the capacitors C6 and C7 until a time when the thyristor SCR6 becomes forward biased and commutates the capacitors C6 and C7.

The use of a resonant dc to dc converter means that the first and second capacitors C1 and C2 can be selectively discharged by turning on the thyristors SCR4 and SCR5 by gate control when the voltage on the capacitors C1 and C2 exceeds a particular threshold. Thereafter, the thyristors SCR4 and SCR5 will recover naturally by the well-known resonant commutation process.

A similar resonant dc to dc converter can be used in the generating mode with the appropriate reversal of the connections between the first and second inductors L1 and L2 and the first and second main dc lines D1 and DC2. However, the selection of suitable component values to cause correct operation in the generating mode is more difficult. These difficulties would increase for circuits designed to work in both motoring and generating modes but alternative dc to dc converter designs may offer workable alternatives.

Figure 9:
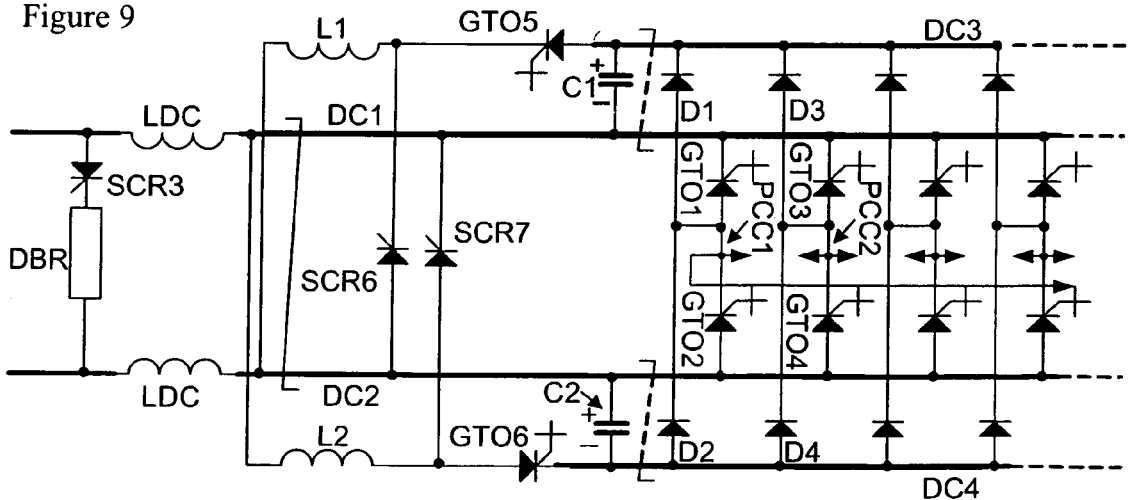
FIG. 9 is a schematic diagram showing a seventh voltage clamping and energy recovery circuit having separate dc to dc converters for each auxiliary dc line that is specifically adapted for an electrical machine that operates normally in a motoring mode, but may occasionally be required to operate in a generating mode.

FIG. 9 shows separate dc to dc converters for the first and second auxiliary dc lines DC3 and DC4. Separate dc to dc converters may be needed if practical component values result in the first and second auxiliary dc lines DC3 and DC4 not tracking each other. The first dc to dc converter of FIG. 9 includes a first GTO switch GTO5 and a first inductor L1 connected in series between the first auxiliary dc line DC3 and the second main dc line DC2, and a thyristor SCR6 having its cathode connected to the junction between the first switch GTO5 and the first inductor L1 and its anode connected to the second main dc line DC2. The second dc to dc converter of FIG. 9 includes a second GTO switch GTO6 and a second inductor L2 connected in series between the second auxiliary dc line DC4 and the first main dc line DC1, and a thyristor SCR7 having its anode connected to the junction between the second switch GTO6 and the second inductor L2 and its cathode connected to the first main dc line DC1. The thyristors SCR6 and SCR7 are always on when the electrical machine is operating in a motoring mode, but must be turned off when the electrical machine is operating in a generating mode. If the electrical machine is to operate only in a motoring mode then thyristors SCR6 and SCR7 can be replaced by diodes. In an embodiment of the circuit of FIG. 9 when only being used for motoring, then two identical control circuits would be used, one for the first switch GTO5 and another for the second switch GTO6. Control inputs to the control circuit would be the current in the relevant inductor (i.e., the first inductor L1 for the first switch GTO5 and the second inductor L2 for the second switch GTO6), sensed by a current transformer, and the forward voltage across the GTO switch that is being controlled. The control circuit would turn the GTO switch on when the forward voltage exceeds a threshold and turn it off when the current in the relevant inductor reaches a second threshold. The control circuit may be designed so that no auxiliary power and no other control inputs are needed.

In the more general case, control of thyristors SCR6 and SCR7, and the selection of the trigger voltage across the GTO switch may be required. The selection of the trigger voltage provides a means of controlling the clamp voltage, which may have benefits in certain applications. Such functions would require further input controls to the control circuit.

What is claimed is:

1. A circuit for use with a stator winding of an electrical machine, the stator winding including a number of coils linked by the same number of points of common coupling, the circuit comprising:
    an electronic commutator circuit having the same number of switching stages, each switching stage being connected between a respective one of the points of common coupling and first and second main dc lines and including:
        a first reverse blocking semiconductor power device capable of being turned on and off by gate control having its cathode connected to the first main dc line; and
        a second reverse blocking semiconductor power device capable of being turned on and off by gate control having its anode connected to the second main dc line;
    a voltage clamping circuit including:
        the same number of clamping stages, each clamping stage being connected between a respective one of the points of common coupling and first and second auxiliary dc lines and including a first diode having its cathode connected to the first auxiliary dc line, and a second diode having its anode connected to the second auxiliary dc line;
        a first capacitor connected between the first main dc line and the first auxiliary dc line; and
        a second capacitor connected between the second main dc line and the second auxiliary dc line; and
    means for selectively discharging the first and second capacitors.

2. The circuit of claim 1, wherein the means for selectively discharging the first and second capacitors is an energy recovery circuit for recovering the energy stored in the first and second capacitors.

3. The circuit of claim 2, wherein the energy recovery circuit includes a dc to dc converter means for selectively discharging the first capacitor to one of the first and second main dc lines and selectively discharging the second capacitor to the other of the first and second main dc lines.

4. The circuit of claim 1, wherein the voltage clamping circuit further includes a third capacitor connected between the first and second auxiliary dc lines.

5. The circuit of claim 1, wherein the voltage clamping circuit further comprising a plurality of first capacitors connected between the first main dc line and the first auxiliary dc line and a plurality of second capacitors connected between the second main dc line and the second auxiliary dc line.

6. The circuit of claim 1, further comprising first and second dc terminals and wherein a series connected thyristor and resistor are connected between the first and second dc terminals.

7. The circuit of claim 3, wherein the dc to dc converter means includes a first semiconductor power device and a first inductor connected in series between the first auxiliary dc line and the second main dc line, a second semiconductor power device and a second inductor connected in series between the second auxiliary dc line and the first main dc line, and a third semiconductor power device having its cathode connected to a junction between the first semiconductor power device and the first inductor and its anode connected to a junction between the second semiconductor power device and the second inductor.

8. The circuit of claim 7, wherein the anode of the first semiconductor power device of the dc to dc converter means is connected to the first auxiliary dc line and the cathode of the second semiconductor power device of the dc to dc converter means is connected to the second auxiliary dc line.

9. The circuit of claim 7, wherein the third semiconductor power device of the dc to dc converter means is a diode.

10. The circuit of claim 7, wherein the third semiconductor power device of the dc to dc converter means is a thyristor.

11. The circuit of claim 3, wherein the dc to dc converter means includes a first semiconductor power device and a first inductor connected in series between the first auxiliary dc line and the first main dc line, a second semiconductor power device and a second inductor connected in series between the second auxiliary dc line and the second main dc line, and a third semiconductor power device having its cathode connected to a junction between the first semiconductor power device and the first inductor and its anode connected to a junction between the second semiconductor power device and the second inductor.

12. The circuit of claim 11, wherein the anode of the first semiconductor power device of the dc to dc converter means is connected to the first auxiliary dc line and the cathode of the second semiconductor power device of the dc to dc converter means is connected to the second auxiliary dc line.

13. The circuit of claim 11, wherein the third semiconductor power device of the dc to dc converter means is a diode.

14. The circuit of claim 11, wherein the third semiconductor power device of the dc to dc converter means is a thyristor.

15. The circuit of claim 3, wherein the dc to dc converter means includes a first inductor connected to the second main dc line, a second inductor connected to the first main dc line, a first semiconductor power device connected between the first auxiliary dc line and the first inductor, a second semiconductor power device connected between the second auxiliary dc line and the second inductor, a third semiconductor power device connected between the first auxiliary dc line and the second inductor, a fourth semiconductor power device connected between the second auxiliary dc line and the first inductor, a fifth semiconductor power device having its cathode connected to a junction between the first semiconductor power device and the first inductor and its anode connected to a junction between the second semiconductor power device and the second inductor, and a sixth semiconductor power device having its cathode connected to a junction between the second semiconductor power device and the second inductor and its anode connected to a junction between the fourth semiconductor power device and the first inductor.

16. The circuit of claim 15, wherein the anodes of the first and third semiconductor power devices of the dc to dc converter means are connected to the first auxiliary dc line and the cathodes of the second and fourth semiconductor power devices of the dc to dc converter means are connected to the second auxiliary dc line.

17. The circuit of claim 15, wherein the fifth and sixth semiconductor power devices of the dc to dc converter means are thyristors.

18. The circuit of claim 3, wherein the dc to dc converter means of the energy recovery circuit is a resonant dc to dc converter means.

19. The circuit of claim 18, wherein the dc to dc converter means includes a first inductor and a first capacitor connected in series between the first auxiliary dc line and the second main dc line, a second inductor and a second capacitor connected in series between the second auxiliary dc line and the first main dc line, a first semiconductor power device and a third inductor connected in series between the first auxiliary dc line and a junction between the first inductor and the first capacitor such that the first semiconductor power device and the third inductor are connected in parallel with the first capacitor, a second semiconductor power device and a fourth inductor connected in series between the second auxiliary dc line and a junction between the second inductor and the second capacitor such that the second semiconductor power device and the fourth inductor are connected in parallel with the second capacitor, and a third semiconductor power device having its cathode connected to the junction between the first inductor and the first capacitor and its anode connected to the junction between the second inductor and the second capacitor.

20. The circuit of claim 19, wherein the anode of the first semiconductor power device is connected to the third inductor and the cathode of the first semiconductor power device is connected to the junction between the first inductor and the first capacitor.

21. The circuit of claim 19, wherein the cathode of the second semiconductor power device is connected to the second auxiliary dc line and the anode of the second semiconductor power device is connected to the fourth inductor.

22. The circuit of claim 19, wherein the anode of the first semiconductor power device is connected to the first auxiliary dc line and the cathode of the first semiconductor power device is connected to the third inductor.

23. The circuit of claim 19, wherein the cathode of the second semiconductor power device is connected to the fourth inductor and the anode of the second semiconductor power device is connected to the junction between the second inductor and the second capacitor.

24. The circuit of claim 19, wherein the first, second and third semiconductor power devices of the dc to dc converter means are thyristors.

25. The circuit of claim 2, wherein the energy recovery circuit includes a first dc to dc converter means for selectively discharging the first capacitor to one of the first and second main dc lines and a second dc to dc converter means for selectively discharging the second capacitor to the other of the first and second main dc lines.

26. The circuit of claim 25, wherein the first dc to dc converter means includes a first semiconductor power device and a first inductor connected in series between the first auxiliary dc line and the second main dc line and a second semiconductor power device having its cathode connected to the junction between the first semiconductor power device and the first inductor and its anode connected to the second main dc line.

27. The circuit of claim 26, wherein the second semiconductor power device is a diode.

28. The circuit of claim 26, wherein the second semiconductor power device is a thyristor.

29. The circuit of claim 25, wherein the second dc to dc converter means includes a first semiconductor power device and a first inductor connected in series between the second auxiliary dc line and the first main dc line and a second semiconductor power device having its anode connected to the junction between the first semiconductor power device and the first inductor and its cathode connected to the first main dc line.

30. The circuit of claim 25, wherein the second semiconductor power device is a diode.

31. The circuit of claim 25, wherein the second semiconductor power device is a thyristor.

32. A method of recovering energy from an electronic commutator circuit for use with a stator winding of an electrical machine, the stator winding having a number of coils linked by the same number of points of common coupling, the electronic commutator circuit having the same number of switching stages, each switching stage being connected between a respective one of the points of common coupling and first and second main dc lines and including:
 a first reverse blocking semiconductor power device capable of being turned on and off by gate control having its cathode connected to the first main dc line; and
 a second reverse blocking semiconductor power device capable of being turned on and off by gate control having its anode connected to the second main dc line;
the method comprising the steps of:
 when one of the first or second reverse blocking semiconductor power devices of a switching stage is turned off by gate control, using the current flowing through said one of the first or second reverse blocking semiconductor power devices to charge a capacitor; and
 selectively discharging the capacitor.

33. The method of claim 32, wherein the capacitor is selectively discharged by an energy recovery circuit for recovering the energy stored in the capacitor.

34. The method of claim 32, wherein the capacitor is selectively discharged by a dc to dc converter means.

35. The method of claim 34, wherein the dc to dc converter means is a resonant dc to dc converter means.

36. The method of claim 32, wherein the capacitor is selectively discharged to one of the first and second main dc lines.

37. The method of claim 32, further comprising the step of monitoring the voltage on the capacitor to determine information about the operating characteristics of the electrical machine.

* * * * *